United States Patent [19]

Watanabe

[11] Patent Number: 4,560,035
[45] Date of Patent: Dec. 24, 1985

[54] DISC BRAKE

[75] Inventor: Namio Watanabe, Saitama, Japan

[73] Assignee: Akebono Brake Industry Co., Ltd., Tokyo, Japan

[21] Appl. No.: 732,894

[22] Filed: May 9, 1985

Related U.S. Application Data

[63] Continuation of Ser. No. 491,973, May 5, 1983, abandoned.

[30] Foreign Application Priority Data

May 14, 1982 [JP] Japan .................................. 57-70163

[51] Int. Cl.[4] ............................................ F16D 65/18
[52] U.S. Cl. .................. 188/72.8; 74/89.15; 92/165 PR; 92/177; 188/71.1
[58] Field of Search ............ 188/71.1, 72.4, 72.5, 188/72.6, 72.7, 72.8, 106 F, 370; 92/165 PR, 177; 74/89.15

[56] References Cited

U.S. PATENT DOCUMENTS

| | | | |
|---|---|---|---|
| 2,942,695 | 6/1960 | Butler | 188/370 X |
| 4,022,300 | 5/1977 | Afanador et al. | 188/72.8 X |
| 4,036,330 | 7/1977 | Henning et al. | 188/72.8 |
| 4,406,352 | 9/1983 | Scott et al. | 188/72.8 |

FOREIGN PATENT DOCUMENTS 2009260  9/1971  Fed. Rep. of Germany ..... 188/72.4

Primary Examiner—George E. A. Halvosa
Attorney, Agent, or Firm—Toren, McGeady, Stanger, Goldberg & Kiel

[57] ABSTRACT

A disc brake includes a rotor, an opposed pair of friction pads each arranged on an opposite side of the rotor, and a caliper which straddles the circumferential periphery of the rotor. The caliper has a pair of leg portions each arranged on an opposite side of the rotor. The caliper is arranged to push one of the friction pads against the rotor by a piston disposed within a cylinder formed in one leg portion and to push the other friction pad against the rotor on the other side with the other leg portion which is arranged to be slidable by a force of reaction to the thrusting action of the piston. A load distribution plate part is formed at the end of the piston which engages the back of the friction pad. This plate part on the piston is arranged to restrict rolling or turning of the piston around its axis by engaging the inner surface of a saddle portion of the caliper straddling the rotor.

1 Claim, 5 Drawing Figures

DISC BRAKE

This is a continuation of application Ser. No. 491,973, filed May 5, 1983, now abandoned.

BACKGROUND OF THE INVENTION

This invention relates to a mechanism for preventing the piston of a disc brake from turning or rolling.

In the conventional disc brakes or the like of the type having friction pads arranged to be pressed against a rotor with the rotating force of a screw shaft which is rotated by an external force converted into an axial forward moving force of a piston which is in screwed engagement with the screw shaft, the position of screwed engagement between the screw shaft and the piston is arranged to be relatively variable to absorb thereby an increase in the gap which increases according as the wear of the lining of the friction pad advances for the purpose of adequately relocating the return position of the piston at the time of brake release.

Meanwhile it is considered essential for the structural arrangement of a disc brake of this type to restrict rolling or turning of the piston round its axis. For this purpose, there have been proposed various contrivances which include, for example, (a) to form the piston into a non-circular shape; (b) to provide turn-preventing projection-and-recess fitting engagement between the piston and the friction pad which is generally unrotatably supported by a support; and (c) in the above stated instance, a load distirbution plate is additionally interposed in between the piston and the firction pad with the two unrotatably engaged with each other.

However, these prior art methods have the following shortcomings: The method (a) is difficult to carry out in terms of machining. In the case of the methods (b) and (c), the load distribution plate tends to be left behind unretracted during the return stroke of the piston to give an adverse effect on rotor rotation, besides the turn preventing arrangement for the piston becomes complicated.

SUMMARY OF THE INVENTION

It is therefore an object of the present invention to provide a disc brake wherein the problems of the prior art methods are solved with a piston part and a load distribution plate part formed in one unified body and, unlike the conventional type, the plate part is arranged to engage the caliper for restricting rolling or turning of the piston part round its axis.

The invention is applicable not only to an air disc brake but also to disc brake of other kinds requiring turn prevention for the piston.

The subject matter of the invention is as follows: In a disc brake comprising a rotor, opposed friction pads arranged on both sides of the rotor and a caliper which straddles the periphery of the rotor and is arranged to thrust one of the firction pads against the rotor by means of a piston disposed within a cylinder formed in a leg portion thereof on one side of the rotor and to press the other friction pad against the rotor on the other side thereof with another leg portion thereof which is arranged to be slidable by a force of reaction to the thrusting action of the piston, a load distribution plate part is formed at the fore end of the piston which engages the back of the friction pad, the load distribution plate part being arranged to restrict turning of the piston round its axis by engaging the inner surface of the saddle portion of the caliper straddling the rotor.

The above and further objects and features of the present invention will become apparent from the following detailed description of a preferred embodiment thereof taken in conjucntion with the accompanying drawings.

DETAILED DESCRIPTION OF PREFERRED EMBODIMENT

Figure 1:
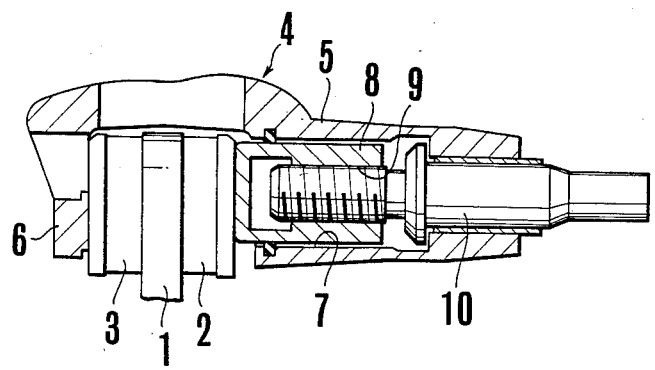
FIG. 1 is a longitudinal sectional view showing a part of a disc brake to which the present invention is applicable.

Referring to FIG. 1 which is a sectional view showing a part of an air disc brake to which the present invention is applicable, the brake arrangement includes a rotor 1, a pair of friction pads 2 and 3 and a caliper 4 which is arranged to straddle the periphery of the rotor 1. The caliper 4 is supported through a slidable support device by a support (not shown) to be slidable in the axial direction of the rotor 1.

The cylinder 7 contains therein a piston 8. The piston 8 is in a tubular shape with one end thereof open to the inner end of the cylinder 7. A thread part 9 is formed at the inner tubular part of the piston 8. A power screw 10 is in screwed engagement with the thread part 9. The power screw is arranged not to axially move in a given position within the cylinder 8. With a rotation force applied thereto by a drive mechanism which is not shown but is arranged to be operated by air pressure, the power screw 10 rotates relative to the piston 8. The piston 8 is moved forward by the rotation of the power screw 10 and comes to push the friction pad 2 against the rotor 1 on one side thereof. The caliper 4 is further provided with another leg portion 6 which is disposed on the other side of the rotor 1 and is arranged to serve as reacting part.

Figure 2:
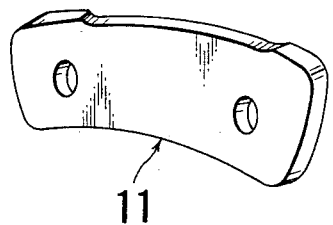
FIG. 2 is an oblique view showing the conventional load distribution plate.

In the conventional arrangement, a load distribution plate 11 which is in a shape as shown in FIG. 2, is interposed in between the friction pad 2 and the piston 8 which are arranged as shown in FIG. 1. The plate 11 is connected to the friction pad by projection-and-recess fitting engagement while it is connected to the piston 8 also by projection-and-recess fitting engagement in such a way as to restrict turning of the piston round its axis. However, this conventional arrangement has presented the problem as mentioned in the foregoing.

Figure 5:
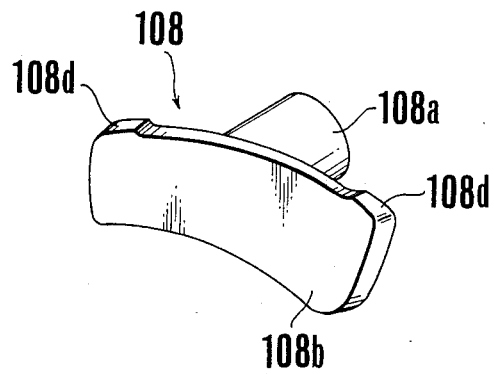
FIG. 5 is an oblique view of the piston.
Figure 3:
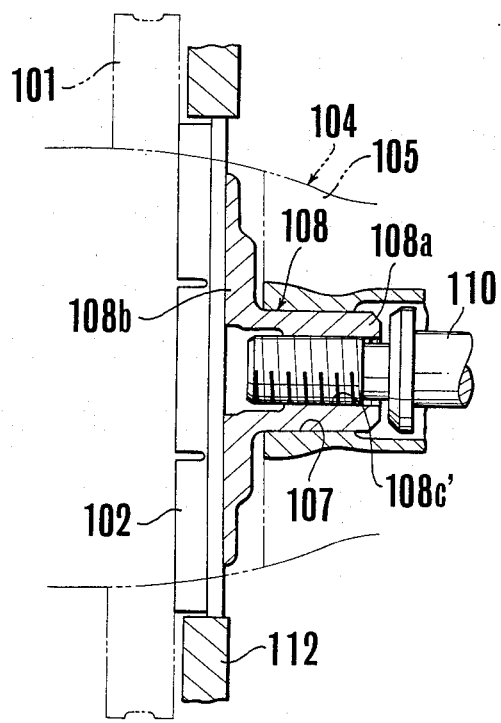
FIG. 3 is a sectional view showing a part of a disc brake as an embodiment of the invention.
Figure 4:
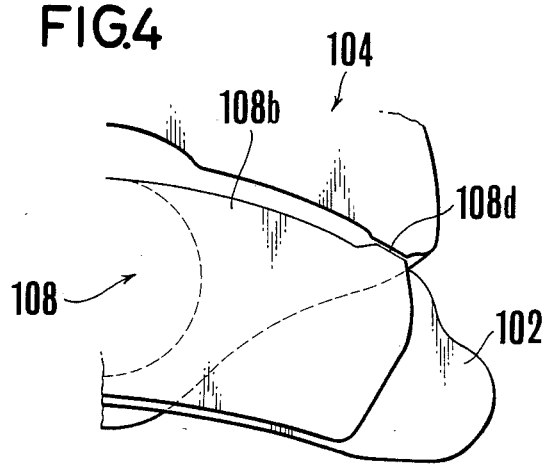
FIG. 4 is an illustration of the relation of a piston to a caliper.

An embodiment of the present invention is as shown in FIGS. 3, 4 and 5. In this embodiment, the structural arrangement of the disc brake is basically the same as that of the disc brake shown in FIG. 1 except that the shape of the piston differs from that of the piston of FIG. 1. Hence, in FIGS. 3 to 5, the members corresponding to the members shown in FIG. 1 are indicated by merely adding 100 to the reference numerals used in FIG. 1 and the details of them are omitted from the following description.

The embodiment includes a rotor 101, a friction pad 102, a caliper 104, a leg portion 105 of the caliper, a cylinder 107 and a power screw 110. A support 112 supports the friction pad 102 to be movable in the axial direction of the rotor 101.

The embodiment is characterized in that: The piston 108 which slidably engages the cylinder 107 is formed into a shape consisting of a tubular piston part 108a and a load distribution plate part 108b (hereinafter will be called the plate part) formed to extend parallel to the rotor 101. The piston part 108a is provided with thread part 108c' which is formed in the inner tubular portion of the piston part 108a and is arranged to engage the power screw 110. The plate part 108b engages the rear side or back of the friction pad 102 and has a pair of protrudent edge parts 108d which are formed at two end parts thereof projecting toward an imaginary cylindrical extension of the motor's circumferential periphery on the outer side of the rotor. The protrudent edge parts 108d are arranged to prevent the plate part 108b from turning round its axis by engaging the inner surface of the saddle part of the caliper 104 straddling the rotor 101.

Meanwhile the caliper 104 is carried by a support 112 through a slidably supporting device which is not shown in the drawing. Therefore, rolling or turning of the piston 108 round its axis is restricted virtually by the caliper 104.

In accordance with the arrangement described above, the piston has the load distribution plate part as an integrated part thereof. Therefore, the arrangement not only gives an effect of dispersing the pressing force at the time of brake application but also prevents turning of the piston with this plate part engaging the inner surface of the saddle part of the caliper. Then, at the time of brake release, the integrated plate part is retracted without fail to obviate the fear of an increase of dragging resistance which would take place if the plate part is left unretracted. It is another advantage of the invention that the structure of the brake as a whole can be simplified.

While a preferred embodiment of the invention has been described it is to be understood that the invention is not limited thereto but may be otherwise variously embodied without departing from the spirit or scope of the following claims. In short, any variations and modification may be made as long as the plate part is arranged to prevent turning of the piston round its axis with the plate part formed into one unified body with the piston part and engaged with the caliper.

As described in the foregoing, the disc brake according to the invention gives an excellent effect with relatively simple structural arrangement. The invention, therefore, has a great practical advantage.

What we claim is:

1. A disc brake having a rotor with an axis of rotation and a circumferential periphery spaced outwardly from the axis of rotation, a pair of friction pads each arranged on an opposite side of said rotor, and a caliper comprising a saddle portion straddling the circumferential periphery of said rotor and a pair of leg portions extending inwardly from said saddle portion toward the axis of said rotor, each said leg portion is located on an opposite side of said rotor from the other said leg portion, a hollow cylinder secured to one of said leg portions and having an axis extending generally parallel to the axis of said rotor, an axially extending power screw positioned within said cylinder with the axis thereof in generally parallel relation with the axis of said cylinder, said power screw having a first end adjacent said rotor and a second end spaced axially from the first end and located more remote from said rotor, a piston having an axis generally parallel to the axis of said cylinder, said piston having an axially extending hollow part positioned within and being axially displaceable relative to said cylinder, said piston having a first end adjacent one of said friction pads and a second end spaced axially away from the one of said friction pads, the first end of said power screw extends into said hollow part of said piston, said hollow part has an interior threaded section and said power screw has an exterior threaded section extending from the first end thereof and in threaded engagement with the interior threaded section in said hollow part, said piston is arranged to press the one of said friction pads against said rotor so that due to a reaction force said caliper slides in the axial direction of said rotor and pushes the other said friction pad against the opposite side of said rotor, wherein the improvement comprises said piston being in sliding contact with said cylinder and being substantially free of rotational restraint by said cylinder whereby relative rotation of said piston and cylinder about the axis of rotation is possible, a load distribution plate rigidly secured to and forming one unified body with the first end of said piston and extending laterally radially outwardly from said hollow part on opposite sides thereof and engages the one of said friction pads on the opposite side of the one of said friction pads from said rotor, said load distribution plate extends parallel to the plane of said rotor and has protrudent portions formed at two end parts each located on an opposite side relative to said hollow part of said piston and projecting toward an imaginary cylindrical extension of the circumferential periphery of said rotor, and said protrudent portions being arranged to engage said saddle portion of said caliper for preventing said piston from rotating about the axis thereof and from rotating relative to said cylinder.

* * * * *